(12) United States Patent
Shulman

(10) Patent No.: US 10,723,402 B2
(45) Date of Patent: Jul. 28, 2020

(54) DEVICE FOR A BICYCLE

(71) Applicant: David Shulman, London (GB)

(72) Inventor: David Shulman, London (GB)

(*) Notice: Subject to any disclaimer, the term of this patent is extended or adjusted under 35 U.S.C. 154(b) by 0 days.

(21) Appl. No.: 16/082,930

(22) PCT Filed: Mar. 7, 2017

(86) PCT No.: PCT/GB2017/050606
§ 371 (c)(1),
(2) Date: Sep. 6, 2018

(87) PCT Pub. No.: WO2017/153738
PCT Pub. Date: Sep. 14, 2017

(65) Prior Publication Data
US 2019/0100265 A1    Apr. 4, 2019

(30) Foreign Application Priority Data

Mar. 7, 2016 (GB) .................... 1603903.4

(51) Int. Cl.
*B62J 6/05* (2020.01)
*B62J 6/02* (2020.01)
(Continued)

(52) U.S. Cl.
CPC . *B62J 6/05* (2020.02); *B62J 6/00* (2013.01); *B62J 6/02* (2013.01); *F21Y 2115/10* (2016.08)

(58) Field of Classification Search
CPC ....... B62J 6/005; B62J 6/02; B62J 6/05; B62J 6/00; F21Y 2115/10; F21W 2107/13;
(Continued)

(56) References Cited

U.S. PATENT DOCUMENTS 3,945,337 A    3/1976 Sweetman
3,961,596 A *  6/1976 Schiavone ............... B62J 6/005
                                                      116/53
(Continued)

FOREIGN PATENT DOCUMENTS

DE    119181 A1    4/1976
DE  10053167 A1    5/2002
(Continued)

OTHER PUBLICATIONS

International Search Report for PCT/GB2017/050606 dated Jun. 2, 2017.
(Continued)

*Primary Examiner* — Bao Q Truong
(74) *Attorney, Agent, or Firm* — Ladas & Parry, LLP

(57) ABSTRACT

A device 1 for a bicycle, the device comprising: an elongate member 2, the elongate member 2 having a first end 2a arranged to be connected to the handlebar of the bicycle and a second end 2b arranged to extend freely; at least one light source 6 arranged to illuminate at least a part of the elongate member 2; wherein the elongate member 2 is flexibly resilient such that, if a force causes the elongate member 2 to move from a first configuration to a second configuration, the elongate member 2 will return to the first configuration once the force is removed; wherein the elongate member 2 is of a length so as to extend outwardly beyond an end of the handlebar.

27 Claims, 2 Drawing Sheets

(51) Int. Cl.
*B62J 6/00* (2020.01)
*F21Y 115/10* (2016.01)

(58) Field of Classification Search
CPC ............. F21V 2200/00; F21V 2200/10; F21V 2200/13; F21V 2200/15; F21V 33/00; G02B 6/00
See application file for complete search history.

(56) References Cited

U.S. PATENT DOCUMENTS

| | | | |
|---|---|---|---|
| 4,586,454 | A | 5/1986 | Hedquist et al. |
| 5,689,232 | A | 11/1997 | O'Shaughnessy et al. |
| 5,872,510 | A | 2/1999 | O'Shaughnessy et al. |

FOREIGN PATENT DOCUMENTS

| | | | |
|---|---|---|---|
| DE | 102010020926 | A1 | 12/2011 |
| EP | 0505182 | A1 | 9/1992 |
| GB | 2490496 | A | 11/2012 |

OTHER PUBLICATIONS

Written Opinion of the International Search Authority PCT/GB2017/050606 dated Jun. 2, 2017.

\* cited by examiner

DEVICE FOR A BICYCLE

CROSS-REFERENCE TO RELATED APPLICATION

The present application is the U.S. National Phase of PCT/GB2017/050606 filed on Mar. 7, 2017 which claims priority to the UK patent application No. 1603903.4, filed with the United Kingdom Intellectual Property Office on Mar. 7, 2016, which are incorporated herein by reference in their entireties.

The present invention relates to a device for a bicycle, and particularly, but not exclusively, to a safety and signalling device for a bicycle which aims to provide a safety buffer around a cyclist. The device may also provide an indication of the direction in which a cyclist intends to turn.

Cyclists are generally more vulnerable than other road users because they are not enclosed within a structure of a vehicle but instead are directly exposed to other traffic. They are also relatively small compared to motorised vehicles, particularly lorries and buses, and therefore can be difficult to see. Other road users often do not leave enough space between their vehicle and a cyclist when passing a cyclist on the road. This can be unnerving and dangerous particularly when large or fast moving vehicles are involved. Furthermore, cyclists are relatively slow compared to motorised vehicles and therefore cannot move out of the way of danger as quickly.

It is also more difficult for cyclists to signal to other road users. Indeed, it has been found that only a minority of cyclists use hand signals or any other form of directional indication prior to making a turn. Whereas motorised vehicles generally have indicator devices in the form of electric flashing lights on the sides or corners of the vehicle which indicate the direction the vehicle intends to turn in, bicycles generally do not have such indicator devices. Conventionally, a cyclist will indicate by giving a hand signal, i.e. extending a hand and arm in the direction they wish to turn. However, this involves removing one hand from the handlebars which reduces the cyclist's ability to control the bicycle. This can be dangerous if the cyclist is on uneven ground or is trying to steer the bicycle.

Of course, the above problems are exacerbated at night because it is even more difficult to see a cyclist and a cyclist's signals when it is dark.

Devices which seek to mitigate one or more of the above problems are known. Conventionally, cyclists place lights on their bicycle. These generally consist of a single white light on the front of the bicycle facing in the direction of travel and a single red light on the rear of the bicycle facing in the opposite direction. The red light is visible to road users approaching the cyclist from behind. However, such lights are often small, are of limited power and provide no indicate of the width of the cyclist.

In addition, cyclists can place fluorescent or reflective armbands on their arms in an effort to make their signals more visible to other road users. However, this does not overcome the problem discussed above of the cyclist having to remove one of their hands from the handlebars. Electric indicator lights for bicycles, similar to those used by motorcycles, are known. However, as the indicator lights are mounted close together and do not extend beyond the width of the bicycle, they are not easily visible and can be ambiguous to read at a distance.

U.S. Pat. No. 3,945,337 describes a device intended to make a bicycle more visible from a distance. The device comprises an arch which extends above the handlebar and has reflective, illuminative, or decorative attachments. The arch is attached at both its ends to the handlebar. However, a significant disadvantage of such a device is that it could snag on a passing object or vehicle with potentially serious consequences. In addition, the lateral or outward extension of the device is limited since both ends are attached to the handlebar.

U.S. Pat. No. 5,872,510 describes a bicycle signalling device which can be mounted on a bicycle. The device includes a centrally mounted holder, two bendable arms connected to and extending away from the holder and a lamp mounted on the end of each arm. The purpose of the bendable arms is to position the lamps above shoulder height where they are more visible. The bendable arms are sufficiently rigid to retain a position imparted to them such that the lamps are retained in position. However, a disadvantage with this device is that the lamps are continuously in the cyclist's field of vision and may dazzle the cyclist, particularly at night, when illuminated. Furthermore, the arms would easily be moved out of position if knocked by the cyclist or a passing object. In addition, the lamps on the end of the bendable arms are bulbous and could snag on passing objects or vehicles.

With respect to the problem of vehicles passing too closely to cyclists, devices seeking to prevent this are also known. U.S. Pat. No. 4,586,454 describes a distance safety stick for a bicycle comprising a guard arm and a mounting device for supporting the guard arm in a horizontally disposed position at one side of the bicycle. The guard arm has an arrow shaped reflector portion to indicate the bicycle's presence to approaching vehicles. However, such a device is not designed to be flexible and is again at risk of snagging on or being damaged by a passing object or vehicle.

The present invention has been devised to seek to overcome the limitations of the known bicycle safety and signalling devices and with the foregoing in mind.

According to an aspect of the present invention, there is provided a device for a bicycle, the device comprising: an elongate member, the elongate member having a first end arranged to be connected to the handlebar of the bicycle and a second end arranged to extend freely; at least one light source arranged to illuminate at least a part of the elongate member; wherein the elongate member is flexibly resilient such that, if a force causes the elongate member to move from a first configuration to a second configuration, the elongate member will return to the first configuration once the force is removed; wherein the elongate member is of a length so as to extend outwardly beyond an end of the handlebar.

Since the elongate member extends outwardly beyond an end of the handlebar, it is visible from both the front and rear of the bicycle and makes the bicycle appear wider than it actually is. Consequently, a "safety buffer" is created to the side of the bicycle because a driver of a passing vehicle will give the cyclist more space to avoid making contact with the elongate member. The plurality of light sources arranged along at least a part of the elongate member increases the visibility of the elongate member in daylight and particularly at night. The free end of the elongate member and its flexibility reduces the likelihood that it will snag on a passing object or vehicle in the event a passing vehicle inadvertently makes contact with the elongate member and the flexible resilient nature of the elongate member means that if it is knocked by a passing object or vehicle, it will return to its original configuration. An advantage of attaching the device to the handlebar of a bicycle is that it is always facing in the direction of travel and provides a clear indication of the movement of the handlebar and therefore direction of travel. Furthermore, due to the device's ease of use and increased visibility, cyclists will be able to provide direction signals more easily and therefore the device will have road safety benefits.

The elongate member may be configured to be spaced apart from and extend substantially parallel to the handlebars in the first configuration. Such a configuration has been found to be particularly effective at making the bicycle appear wider than it actually is and still provides space for the cyclist to grip the handlebar.

Optionally, the elongate member may be configured to extend in front of and below the handlebar. Such an arrangement has been found to be particularly beneficial in not interfering with the cyclist's grip of the handlebar and/or use of the bicycle brakes.

The elongate member may be between 15 and 35 cm in length. Such a range of lengths has generally been found to be sufficient to allow the elongate member to extend beyond an end of the handlebar.

Optionally, the elongate member may be tapered from the first end to the second end. Tapering of the elongate member so that it is narrower at its second end (i.e. the end which extends freely) than at its first end (i.e. the end which is fixed by its connection to the handlebar), has been found to reduce the likelihood of the member snagging on passing objects or vehicles.

The elongate member may be transparent or translucent and the light source may be arranged to direct at least a portion of the light from the light source along and within the elongate member. This provides the appearance of part or the whole elongate member being illuminated, which further increases the visibility of the device.

The light source may be contained within the elongate member. Such an arrangement protects the light source and further reduces the risk of snagging.

Optionally, the light source may be configured to selectively light continuously or intermittently. The light source may be configured to flash. A light source which lights intermittently or flashes is more noticeable to other road users and this feature allows a cyclist to select the level of indication required.

The light source may be configured to present light of a first colour when viewed from a viewpoint in front of the bicycle and to present light of a second colour when viewed from a viewpoint behind the bicycle. This can provide an indication to other road users of the direction in which the bicycle is travelling. For example, the light source may use conventional colours, i.e. the first and second colours may be white and red respectively.

The light source may comprise one or more LEDs. LEDs are a particularly convenient light source in that they are suitably small and robust and have low power consumption and a long lifespan.

Optionally, the device may comprise a plurality of light sources arranged along at least a part of the elongate member. This provides another way of illuminating a length of the elongate member.

The elongate member may be transparent or translucent and the plurality of light sources may be contained within the elongate member. Such an arrangement protects the light source and further reduces the risk of snagging.

Optionally, the plurality of light sources may be arranged to direct at least a portion of the light from the light sources along and within the elongate member. This provides the appearance of part or the whole elongate member being illuminated, which further increases the visibility of the device.

The plurality of light sources may be configured to selectively light continuously, light intermittently or light in sequence along the length of the elongate member. The plurality of light sources may be configured to flash. Light sources which light intermittently or flash are more noticeable to other road users and this feature allows a cyclist to select the level of indication required.

The plurality of light sources may be configured to selectively light continuously, light intermittently or light in sequence along the length of the elongate member. The plurality of light sources may be configured to flash. Light sources which light intermittently, flash or light sequentially are more noticeable to other road users and provide another level of indication which the cyclist can select.

Optionally, the light sources may be configured to light in sequence along the length of the elongate member in a direction extending outwardly from the bicycle. This can provide an indication of a direction in which a cyclist intends to turn.

The plurality of light sources may be configured to present light of a first colour when viewed from a viewpoint in front of the bicycle and to present light of a second colour when viewed from a viewpoint behind the bicycle. This can provide an indication to other road users of the direction in which the bicycle is travelling. For example, the plurality of light sources may use conventional colours, i.e. the first and second colours may be white and red respectively.

The plurality of light sources may comprise LEDs. LEDs are a particularly convenient light source in that they are suitably small and robust and have low power consumption and a long lifespan.

Optionally, the first end of the elongate member may be adapted to be connected directly to the handlebar. Alternatively, the device may further comprise a mounting member adapted to connect the first end of the elongate member to the handlebar. A mounting member provides a convenient way of attaching the elongate member. The mounting member may be configured to be rigid or flexible.

The mounting member may comprise a power source for the device. The mounting member may also comprise a switch for controlling the light source or light sources. Uses of the switch include, but are not limited to, turning the light source or light sources on and off and also selecting the different illumination modes discussed above.

Optionally, the device may further comprise a pivot for allowing the device to move to a stowed configuration in which the elongate member does not extend outwardly beyond an end of the handlebar. This configuration could be adopted when the bicycle is not in use or if the cyclist needs to squeeze through a narrow gap.

According to a second aspect of the present invention, there is provided a kit of parts comprising two of the devices of any one of the arrangements discussed above, one for each handle or side of the handlebar.

The kit of parts may further comprise a connector 23 between the two devices in order to provide synchronised control of the respective light source or light sources of each device. Optionally, the connector 23 may be a radio connection, which provides a particularly convenient means of connection as it does not involve a physical connection such as a wire.

One or more specific embodiments in accordance with aspects of the present invention will now be described, by way of example only, and with reference to the following drawings in which.

Figure 1:
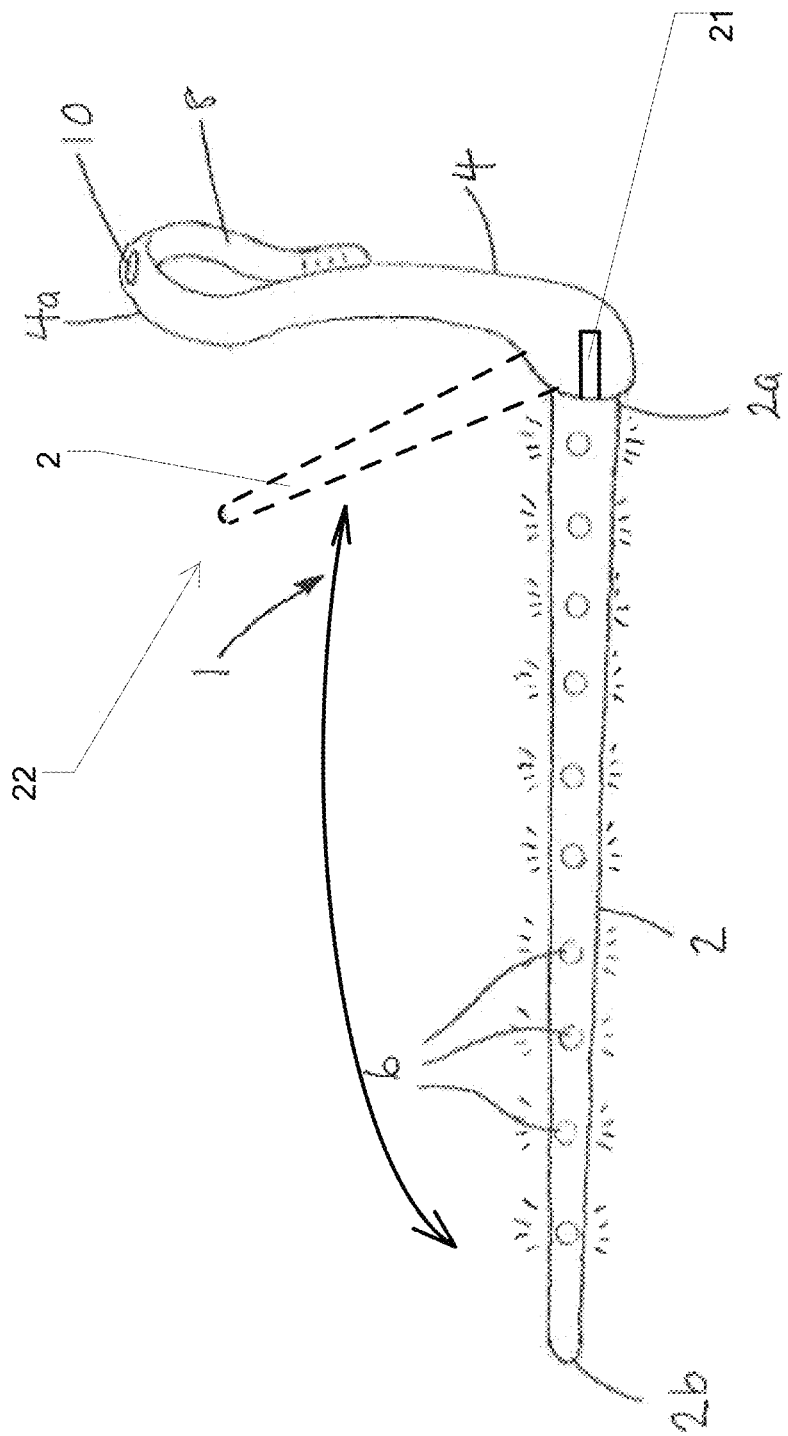
FIG. 1 is a perspective view of a device in accordance with an embodiment of the present invention.

FIG. 1 shows a device 1 for a bicycle (not shown) comprising an elongate member 2 and a mounting member 4. The mounting member 4 is used to attach the device 1 to a bicycle. The elongate member 2 comprises a first end 2a, which is attached to the mounting member 4, and a second end 2b, which is arranged to extend freely. The first end 2a of the elongate member 2 is therefore arranged to be connected, via the mounting member 4, to the handlebar of a bicycle and constitutes a fixed end 2a. The second end 2b constitutes a free end 2b of the elongate member.

In addition, the elongate member 2 comprises a plurality of light emitting diodes (LEDs) 6 arranged along its length at regular intervals. The number of LEDs used will depend on the length of the elongate member 2 and the amount of light that is required. The LEDs 6, when illuminated, act as light sources which increase the visibility of the elongate member, particularly at night or in low light conditions.

The elongate member 2 comprises a hollow tube which tapers from the fixed end 2a to the free end 2b such that the free end 2b has a smaller diameter than the fixed end 2a. Tapering reduces the risk of the elongate member 2 snagging on a passing object and also means that the elongate member 2 becomes more flexible towards its free end 2b.

The LEDs 6 are arranged inside the elongate member 2, which is made from a suitably flexible and resilient material, for example a thermoplastic polymer such as low density polyethylene or polyvinyl chloride. In order to allow the light emitted by the LEDs 6 to be visible, the elongate member 2 is transparent or translucent. Due to internal reflections within the elongate member 2, a portion of the light from the LEDs 6 is reflected internally along the elongate member 2 such that, in addition to each individual light source of each individual LED 6 being visible, a part or the whole of the elongate member 2 appears to be illuminated or glowing. This creates a particularly eye-catching or noticeable arrangement which is effective at drawing the attention of other road users and making the cyclist more visible. The skilled person will appreciate that the same effect can be achieved by a single light source, for example, comprising just one LED or other form of light source. The single light source can be arranged to direct at least a portion of its emitted light along and within the elongate member 2. A portion of the light from the single light source will be reflected internally along the elongate member 2 such that a part or the whole of the elongate member 2 appears to be illuminated or glowing.

The mounting member 4 has a clip 8 at a mounting end 4a of the mounting member 4 for attaching the device 1 to a bicycle. When attached to the handlebar (not shown) of a bicycle, the clip 8 grips the handlebar and holds the device 1 in position. The clip 8 can be simply pushed on to or pulled off the handlebar for quick attachment or removal. The clip 8 is also formed integrally with the mounting member 4 which is made from a suitably resilient and tough material, such as acrylonitrile butadiene styrene (ABS). The elongate member 2 and mounting member 4 extend substantially at right angles to each other such that when the device 1 is attached to a bicycle the elongate member 2 extends substantially parallel to and spaced apart from the handlebar.

A switch 10 for controlling the LEDs is provided on the mounting member 4. The switch 10 can be used to turn the LEDs on or off or to select various lighting modes for the LEDs. For example, the LEDS can be controlled to light continuously, to flash or to light in sequence along the length of the elongate member 2. Flashing or sequentially lighting LEDs may make the device 1 more eye-catching and therefore noticeable to other road users. Furthermore, the LEDs can be made to light in sequence along the length of the elongate member 2 in a direction extending outwardly from the bicycle, i.e. from the fixed end 2a to the free end 2b. Such a lighting mode can be used to provide a directional indication to other road users, i.e. to indicate the direction in which a cyclist intends to turn. In addition, the device 1 can be configured so that the LEDs flash in response to the cyclist's speed, for example, by including an accelerometer (not shown) within the device 1 which provides a signal indicative of the speed the bicycle is moving at.

The mounting member 4 may also comprise a power source (not shown) for the LEDs.

Figure 2:
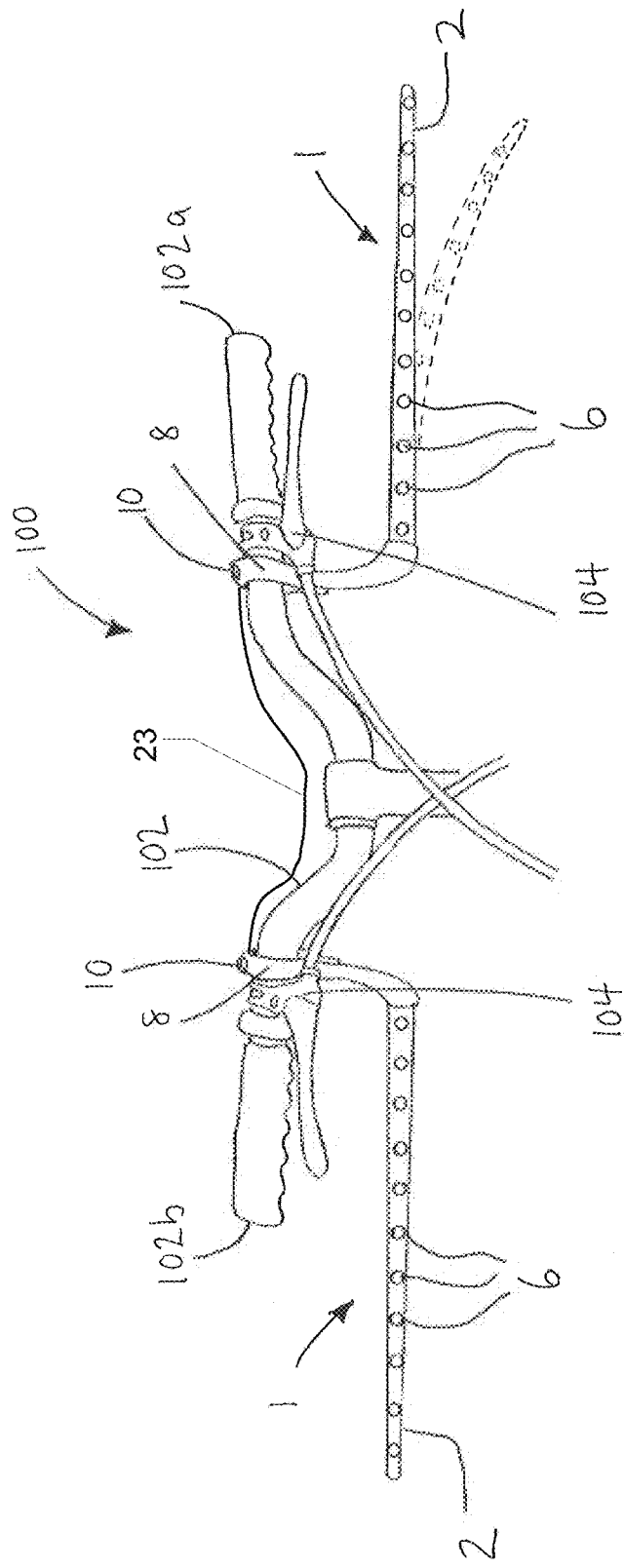
FIG. 2 is a view from a front perspective of a device in accordance with an embodiment of the present invention attached to either side of a handlebar of a bicycle.

FIG. 2 shows a device 1 attached to either side of a handlebar 102 of a bicycle 100, i.e. one for each handle of the handlebar. The elongate member 2 of each device 1 extends outwardly (i.e. in a direction away from the centre of the handlebar) beyond the ends 102a and 102b of the handlebar 102. The elongate members 2 are spaced apart from and extend substantially parallel to the handlebar 102. Such an arrangement enhances the outward extension of the elongate members 2, i.e. it increases the safety buffer on either side of the bicycle 100 compared to an arrangement in which the elongate members 2 extend at an angle to the handlebar 102. It also still allows space for the cyclist to grip the handles of the handlebar 102 and use the brakes 104.

The elongate member 2 is between 15 and 35 cm in length. This range of lengths has been found to provide sufficient extension of the elongate member 2 beyond the end of the handlebar 102 of a bicycle. The skilled person will appreciate that the elongate member 2 can be of a different length, depending on the amount of extension required and the size of the bicycle. The skilled person will also appreciate that the amount of extension can be altered by changing the point at which the device 1 is attached to the handlebar 102.

Each device 1 is clipped to the handlebar 102 by means of clip 8 at a point just inward (i.e. in a direction toward the centre of the handlebar) of the point at which the brakes 104 are attached. Each device 1 can be rotated about clip 8 so that it is forward of and below the handlebar 102. Such an arrangement has been found to be particularly beneficial in not interfering with the cyclist's grip of the handlebar 102 and/or use of the bicycle brakes 104.

As discussed above, the elongate members 2 are made from a suitably flexible and resilient material so that they bend if they strike a passing object or vehicle. If a force, caused for example by an impact with a passing object, results in the elongate members 2 being moved out of their standard mounted position, i.e. a first configuration (shown in solid lines in FIG. 2), to a deformed position, i.e. a second configuration (shown in dotted lines in FIG. 2), then, due to their resilience and flexibility, the elongate members 2 will return to the first configuration once the force is removed. This reduces the likelihood of the forward momentum or control of the bicycle by the cyclist being adversely affected by an impact of the elongate members 2 with a passing object or vehicle and also the likelihood of the elongate members being damaged.

A connector (not shown in FIG. 2) may be provided to connect the two devices 1 in order to provide synchronised control of the LEDs 6. For example, if a cyclist sets the LEDs 6 of one of the devices 1 to light in sequence, then the connector will control the other device 1 to do likewise. Synchronous control of the two devices 1 can be inhibited if the cyclist wishes to use the devices 1 to signal a direction in which they wish to turn. In which case only one of the devices 1, i.e. the device extending in the direction of the turn, will provide the indication, for example, by flashing, whilst the other device 1 may, for example, just light continuously. The connector may be a radio connection to avoid the use of wires extending between the devices 1.

In use, a cyclist attaches a device 1 to each side of their handlebar, as shown in FIG. 2. The cyclist will turn the LEDs 6 on by pressing button 10. Further presses of the button 10 will cycle through the various lighting modes discussed above, i.e. light continuously, flash or light in sequence. The button 10 is conveniently located near the cyclist's hand on the handlebar 102 and on the part of the clip 8 which faces the cyclist so that it can be operated easily whilst the cyclist is cycling without having to remove their hands from the handlebar 102, for example, by using their thumb.

As the cyclist cycles, the illuminated elongate members 2 extend outwardly beyond the ends of the handlebar 102 such that they are clearly visible to vehicles approaching the cyclist both from the front and the rear. This creates a safety buffer on either side of the cyclist into which other roads users are deterred from entering. If the cyclist wishes to turn either left or right, they press the button 10 on the respective device 1 to change the lighting mode, for example, from light continuously to flashing, in order to indicate that they intend to turn in that direction.

Various modifications will be apparent to those skilled in the art. For example, instead of the device comprising multiple LEDs, it may comprise just one LED or other light source. Instead of the light source being LEDs, any suitable light source could be used including, but not limited to, incandescent light bulbs, fluorescent light bulbs, fibre optic cables, electroluminescent members, or other light sources. Further, the LEDs do not need to be contained within the elongate member but could be mounted on or embedded in its surface or mounted on a separate flexible central member or spine within the elongate member. The LEDs can be of various different colours. The LEDs can also be multicolour LEDs such that operation of the button changes the colour of the light that the LED emits. The device can be manufactured from any suitable material or combination of suitable materials in order to provide the properties required. The device may have an opaque divide arranged centrally along the length of the elongate member with LEDs of different colours on either side of the divide so that different colour light can be viewed from opposing sides of the device. Instead of a clip, the device could be attached to the handlebar in other ways, for example, using Velcro™, a clamp, quick release mechanism or any other suitable attachment. In addition, the device could comprise an additional light source intended for forward illumination in order to light the road in the direction the cyclist is travelling in dark urban or rural areas.

Moreover, the device could comprise a pivot 21 or a rotatable coupling for allowing the device to move to a stowed configuration 22 in which the elongate member 2 does not extend outwardly beyond an end of the handlebar. For example, in such stowed configuration 22 the elongate member 2 could be moved or pivoted backwards by approximately 90° so that it extends substantially parallel to the frame of the bicycle. This configuration could be adopted when the bicycle is not in use, i.e. when a safety buffer around the cyclist is not required. Alternatively, this configuration could be used if the cyclist needs to squeeze through a narrow gap, i.e. a gap narrower than the overall length of the elongate members 2 in their outwardly extending configuration. A cyclist can simply move or pivot the device into the stowed configuration 22 so that the elongate members 2 are not continuously subject to a bending stress whilst travelling through the gap. Such a feature would also reduce stress or pressure on the elongate members 2 when the bicycle is not being used, e.g. if it is being leant against a wall or railing. Any suitable pivot 21 or rotatable coupling could be used, for example, an articulated joint, hinge or rotatable collar. The pivot 21 or rotatable coupling may comprise a mechanism to hold the device stably in either the stowed or outwardly extending configuration, for example, an over-centre mechanism or a plurality of castellations or protrusions biased against a holding member. Either the mounting member or the elongate member 2 could comprise the pivot or rotatable coupling.

All references made herein to orientation (e.g. top, bottom, front and back) are made for the purposes of describing relative spatial arrangements of the features of the apparatus, and are not intended to be limiting in any sense. The skilled person will appreciate that references made to orientation or direction herein are with respect to a bicycle in normal use.

The invention claimed is:

1. A device for a bicycle, the device comprising:
   an elongate member, the elongate member having a first end arranged to be connected to the handlebar of the bicycle and a second end arranged to extend freely;
   at least one light source arranged to illuminate at least a part of the elongate member;
   wherein the elongate member is flexibly resilient such that, if a force causes the elongate member to move from a first configuration to a second configuration, the elongate member will return to the first configuration once the force is removed;
   wherein the elongate member is of a length so as to extend outwardly beyond an end of the handlebar; and
   wherein the elongate member is transparent or translucent and the light source is arranged to direct at least a portion of the light from the light source along and within the elongate member.

2. A device according to claim 1, wherein the elongate member is configured to be spaced apart from and extend substantially parallel to the handlebar in the first configuration.

3. A device according to claim 2, wherein the elongate member is configured to extend in front of and below the handlebar.

4. A device according to claim 1, wherein the elongate member is between 15 and 35 cm in length.

5. A device according to claim 1, wherein the elongate member is tapered from the first end to the second end.

6. A device according to claim 1, wherein the light source is contained within the elongate member.

7. A device according to claim 1, wherein the light source is configured to selectively light continuously or intermittently.

8. A device according to claim 7, wherein the light source is configured to flash.

9. A device according to claim 1, wherein the light source is configured to present light of a first colour when viewed from a viewpoint in front of the bicycle and to present light of a second colour when viewed from a viewpoint behind the bicycle.

10. A device according to claim 1, wherein the light source comprises one or more LEDs.

11. A device according to claim 1, wherein the device comprises a plurality of light sources arranged along at least a part of the elongate member.

12. A device according to claim 11, wherein the elongate member is transparent or translucent and the plurality of light sources are contained within the elongate member.

13. A device according to claim 12, wherein the plurality of light sources are arranged to direct at least a portion of the light from the light sources along and within the elongate member.

14. A device according to claim 11, wherein the plurality of light sources are configured to selectively light continuously, light intermittently or light in sequence along the length of the elongate member.

15. A device according to claim 14, wherein the plurality of light sources are configured to flash.

16. A device according to claim 14, wherein the light sources are configured to light in sequence along the length of the elongate member in a direction extending outwardly from the bicycle.

17. A device according to claim 11, wherein the plurality of light sources are configured to present light of a first colour when viewed from a viewpoint in front of the bicycle and to present light of a second colour when viewed from a viewpoint behind the bicycle.

18. A device according to claim 11, wherein the plurality of light sources comprises LEDs.

19. A device according to claim 1, wherein the first end of the elongate member is adapted to be connected directly to the handlebar.

20. A device according to claim 1, further comprising a mounting member adapted to connect the first end of the elongate member to the handlebar.

21. A device according to claim 20, wherein the mounting member is configured to be rigid or flexible.

22. A device according to claim 20, wherein the mounting member comprises a power source for the device.

23. A device according to claim 20, wherein the mounting member comprises a switch for controlling the light source or sources.

24. A device according to claim 1, further comprising a pivot for allowing the device to move to a stowed configuration in which the elongate member does not extend outwardly beyond an end of the handlebar.

25. A kit of parts comprising two of the devices of claim 1, one for each handle of the handlebar.

26. A kit of parts according to claim 25, further comprising a connector between the two devices for providing synchronised control of the respective light source or sources of each device.

27. A kit of parts according to claim 25, wherein the connector is a radio connection.

* * * * *